(12) United States Patent  
Athelogou et al.

(10) Patent No.: US 8,909,692 B2
(45) Date of Patent: Dec. 9, 2014

(54) COMPUTER-IMPLEMENTED SYSTEM FOR PROGRESSIVELY TRANSMITTING KNOWLEDGE

(75) Inventors: Maria Athelogou, Munich (DE); Ursula Benz, Alling (DE)

(73) Assignee: Definiens AG, Munich (DE)

( * ) Notice: Subject to any disclaimer, the term of this patent is extended or adjusted under 35 U.S.C. 154(b) by 2212 days.

(21) Appl. No.: 11/244,751

(22) Filed: Oct. 6, 2005

(65) Prior Publication Data

US 2006/0026111 A1    Feb. 2, 2006

Related U.S. Application Data

(63) Continuation of application No. PCT/EP2004/050487, filed on Apr. 7, 2004.

(30) Foreign Application Priority Data

Apr. 7, 2003   (DE) .................................. 103 15 785

(51) Int. Cl.
   *G06F 15/16*   (2006.01)
   *G06N 5/04*   (2006.01)
(52) U.S. Cl.
   CPC ....................................... *G06N 5/04* (2013.01)
   USPC ........................................... 709/203; 709/250

(58) Field of Classification Search
   USPC .................................................. 709/250, 231
   See application file for complete search history.

(56) References Cited

U.S. PATENT DOCUMENTS

| 4,829,450 A | * | 5/1989 | Manthey | ........................ 706/62 |
| 4,858,017 A | * | 8/1989 | Torbey | .......................... 382/240 |
| 6,192,364 B1 | * | 2/2001 | Baclawski | ...................... 707/10 |
| 2003/0233403 A1 | * | 12/2003 | Bae et al. | ...................... 709/203 |

* cited by examiner

*Primary Examiner* — Joon H Hwang
*Assistant Examiner* — Sherman Lin
(74) *Attorney, Agent, or Firm* — Imperium Patent Works; Darien K. Wallace

(57) ABSTRACT

A computer-implemented system for progressively transmitting of knowledge between system nodes of a network structure comprises a plurality of system nodes and intelligent interfaces by which respective system nodes are coupled with each other for performing a communication. The intelligent interfaces transmit object features of cognition structure objects comprising knowledge, information and data depending on a respective question of a respective one system nodes progressively more faithful to detail from another of the respective system nodes to the one of the respective system nodes. Furthermore, there are disclosed a corresponding method and a computer program product relating to the system and method.

24 Claims, 13 Drawing Sheets

$$(1) \quad F(k) = \begin{pmatrix} \text{mean area} \\ \text{minimum area} \\ \cdots \\ \text{number of objects} \\ \text{strength of segmentation} \end{pmatrix}$$

$$(2) \quad F'(k) = \begin{pmatrix} \mu_{\text{mean area}}(B_1) & \mu_{\text{mean area}}(B_2) & \mu_{\text{mean area}}(B_N) \\ \mu_{\text{minimum area}}(B_1) & \mu_{\text{minimum area}}(B_2) & \mu_{\text{minimum area}}(B_N) \\ \cdots & \cdots & \cdots \\ \mu_{\text{number of objects}}(B_1) & \mu_{\text{number of objects}}(B_2) & \mu_{\text{number of objects}}(B_N) \\ \mu_{\text{strength of segmentation}}(B_1) & \mu_{\text{strength of segmentation}}(B_2) & \mu_{\text{strength of segmentation}}(B_N) \end{pmatrix}$$

FIG. 16

COMPUTER-IMPLEMENTED SYSTEM FOR PROGRESSIVELY TRANSMITTING KNOWLEDGE

CROSS REFERENCE TO RELATED APPLICATION

This application is filed under 35 U.S.C. §111(a) and is based on and hereby claims priority under 35 U.S.C. §120 and §365(c) from International Application No. PCT/EP2004/050487, filed on Apr. 7, 2004 and published as WO 2004/090808 on Oct. 21, 2004, which in turn claims priority from German Application No. 103 15 785.9, filed on Apr. 7, 2003. This application is a continuation of International Application No. PCT/EP2004/050487, which is a continuation of German Application No. 103 15 785.9. International Application No. PCT/EP2004/050487 was pending as of the filing date of this application, and the United States was an elected state in International Application No. PCT/EP2004/050487. This application claims the benefit under 35 U.S.C. §119 from German Application No. 103 15 785.9, filed on Apr. 7, 2003, in Germany. The disclosure of each of the foregoing documents is incorporated herein by reference.

TECHNICAL FIELD

The present invention relates generally to a computer-implemented system and method for progressively transmitting knowledge and a computer program product related thereto.

BACKGROUND

In the art there are known computer systems in which generating, storing and/or processing of data does not take place at the same location. Therefore, an amount of data to be transmitted forms a bottle-neck despite increasing resources and can lead to a significant restriction of efficiency of the whole system.

To reduce the amount of data to be transmitted there are known various data compression methods. It can generally be distinguished between methods using lossy source coding and methods using loss-free source coding. Source coding is conversion of a data word in a corresponding data word using of a redundancy decreasing code. In loss-free source coding transmitted data can be fully restored by a suitable decompression, whereas this is not the case in lossy source coding.

Currently used adaptive data compression methods are for example JPEG and MPEG, wherein these are applied to all data of a data set. These adaptive data compression methods fit on a mostly fluctuating statistic of the data. Therefore, these methods are often called "context sensitive". Either the transmitter or the receiver determines a medium or minimal quality of reconstruction for all data or a data rate before transmission, respectively. All data are then transmitted in correspondence with the determined quality or data rate, respectively.

Furthermore, there are known so-called progressive data compression methods that usually are based on so-called wavelets. These progressive data compression methods allow for a piece-by-piece reconstruction of data, wherein the receiver can determine which transmitted amount of data is sufficient. During transmission it can be determined when transmission of data is canceled. Therefore, an amount of data to be transmitted can be decreased. In general, all of the data is transmitted until transmission of data is canceled.

Independent of data compression, data mining methods (i.e., methods that relate to a directed or subject-related search of data) allow for data sets of interest to be searched for in a database. Here, the term "of interest" is limited to identification of data sets having similar features. Detection of data sets of interest normally takes place by monitored training using examples.

However, it is common to all aforementioned methods that, on the one hand, only data are transmitted and, on the other hand, compression of data is limited to such a degree that the receiver can meaningfully process and/or use transmitted data. The respective used transmission channel is consequently not used effectively, thereby leading to a bottle-neck on the transmission channel.

SUMMARY

It is accordingly the object of the present invention to provide a computer-implemented system and method by means of which a more effective use of a respective transmission channel is possible. With respect to the system, this object is solved by intelligent interfaces that couple system nodes of a network structure to each other and that establish communication between the system nodes. The intelligent interfaces transmit object features of cognition structure objects. The object features comprise knowledge, information and data depending on a question of one of the system nodes transmitted progressively more faithful to detail from another of the respective system nodes to the one of the respective system nodes With respect to the method, this object is solved by transmitting object features of cognition structure objects progressively more faithful to detail. The object features comprise knowledge, information and data depending on a question of one of the system nodes from another of the respective system nodes to the one of the respective system nodes.

In accordance with one embodiment of the invention, a computer-implemented system for progressively transmitting knowledge between system nodes of a network structure comprises a plurality of system nodes and intelligent interfaces. The system nodes are coupled with each other by the intelligent interfaces, which allows for communication between the system nodes. The intelligent interfaces transmit object features of cognition structure objects. The object features comprise knowledge, information and data, depending on a respective question of a respective one of the system nodes transmitted progressively more faithful to detail from another of the respective system nodes to the one of the respective system nodes. Roughly focused knowledge, information and/or data is transmitted with highest priority. Such roughly focused knowledge, information and/or data occupies much less transmission capacity of a transmission channel than data itself.

Only when it is determined that further detailed knowledge, further detailed information and/or further detailed data is necessary are these items transmitted with a priority corresponding to the aforementioned order. In this manner, knowledge is progressively transmitted by more effectively using the transmission channel as compared with conventional data compression methods.

In another embodiment, a computer-implemented method progressively transmits knowledge between system nodes of a network structure. The method comprises a step of transmitting object features progressively more faithful to detail. The object features of cognition structure objects comprise knowledge, information and data, depending on a respective question from another of the respective system nodes to the one of the respective system nodes.

In yet other embodiment, a computer-readable medium comprises program instructions for transmitting object features of cognition structure objects progressively more faithful to detail between system nodes of a network structure. the transmitte dobject features comprise knowledge, information and data depending on a question of one of the system nodes from another of the respective system nodes to the one of the respective system nodes. The cognition structure objects are hierarchically structured in a hierarchically structure.Dta objects are located on a lower level of the hierarchical structure. The progressively more faithful to detail transmitting is performed from a higher level to the lower level of the hierarchical structure.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 16 is a diagram of equations describing a feature vector F(k).

DETAILED DESCRIPTION

Reference will now be made in detail to some embodiments of the invention, examples of which are illustrated in the accompanying drawings.

In an embodiment, a self-organizing, semantic, self-similar cognition network of objects or triple-SN can be used as a knowledge base. Such a triple-SN is for example described under the designation "fractal-hierarchical network" in WO00/20964, WO00/63788, WO00/00497, WO01/45033 and WO02/05198, wherein methods described in these documents can be furthermore used in a processing operation according to the embodiment. These documents are incorporated herein by reference.

Figure 1A:
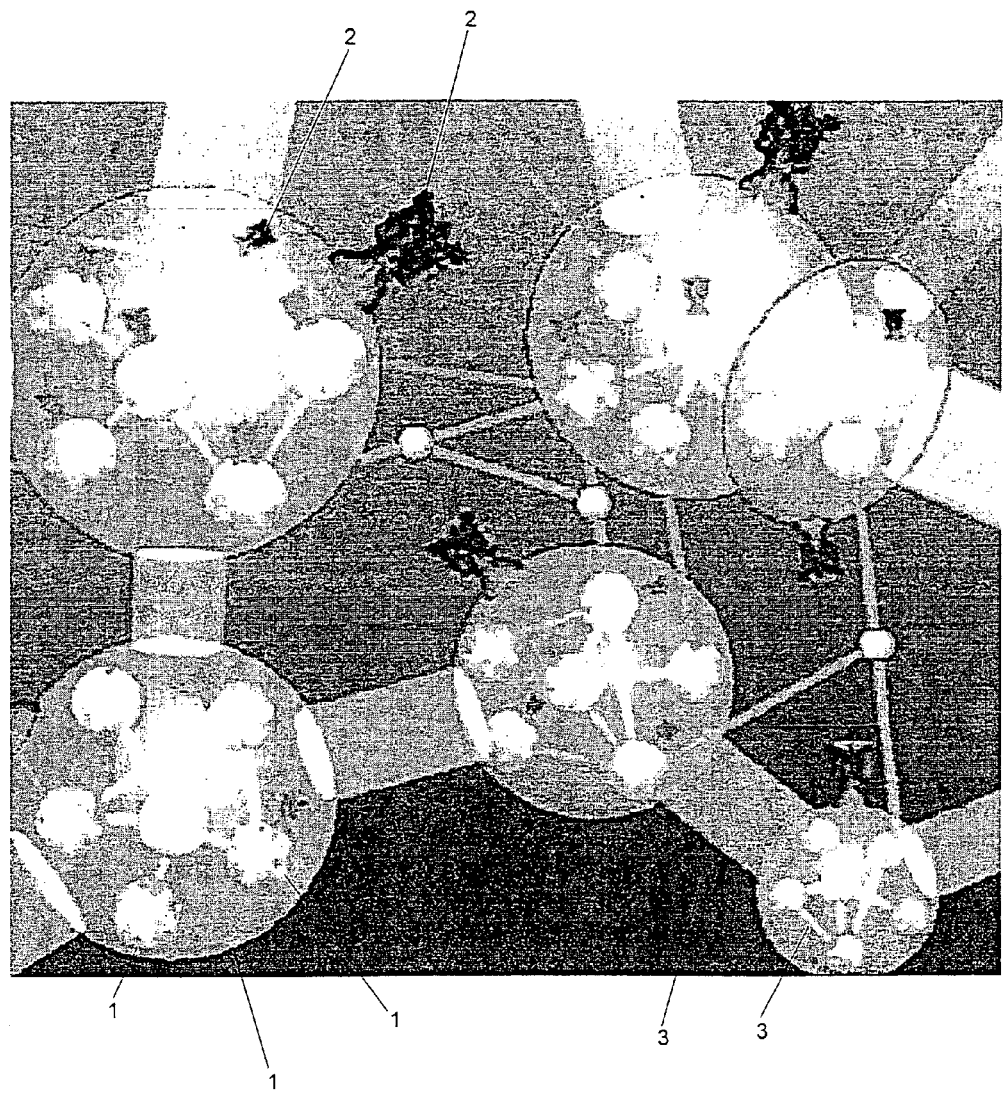
FIGS. 1A and 1B are a schematic illustration of a knowledge base that can be used in an embodiment of the present invention in two different kinds of representation.
Figure 1B:
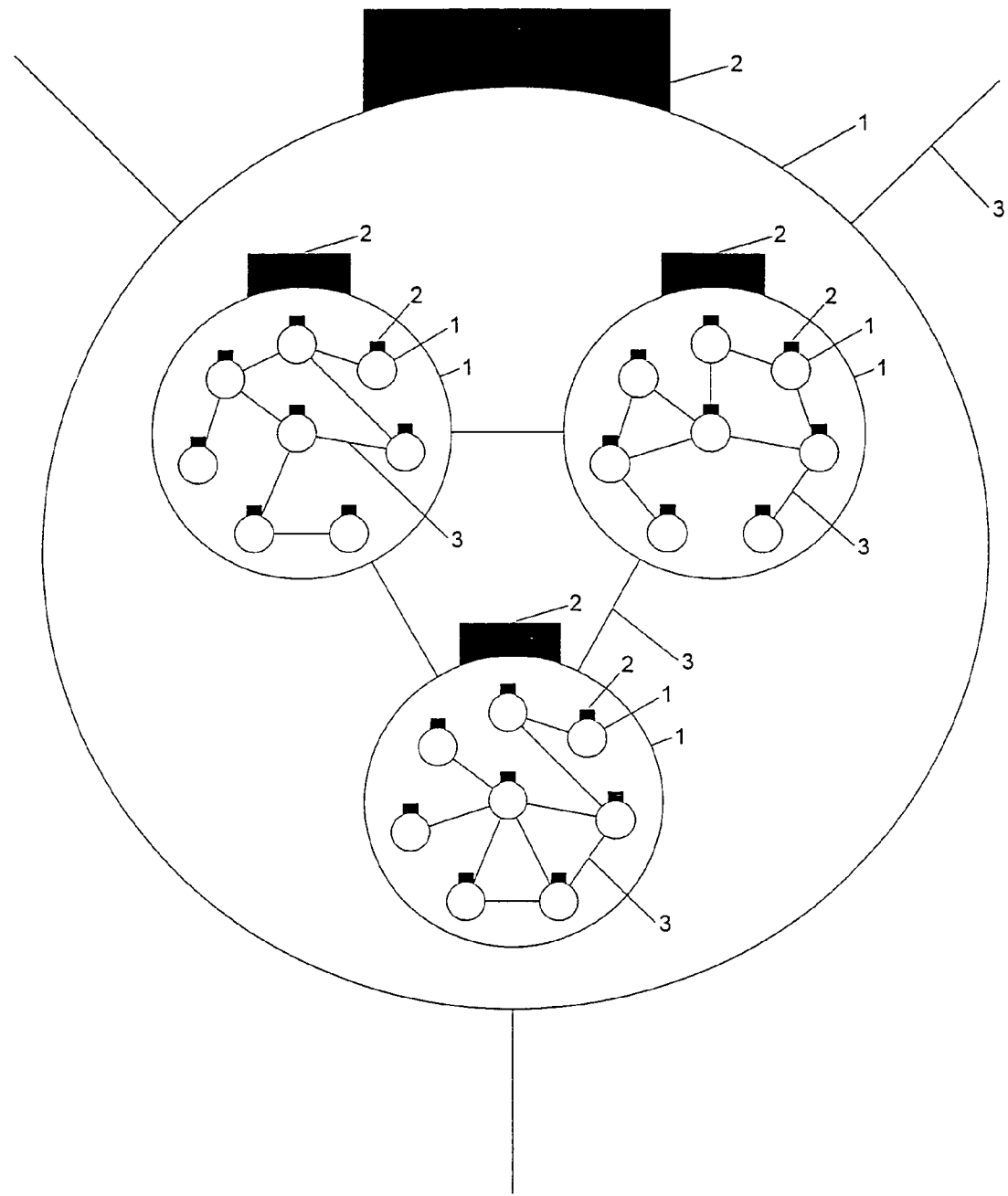

FIGS. 1A and 1B are a schematic illustration of a knowledge base which can be used in an embodiment of the present invention. FIGS. 1A and 1B refer to two different kinds of representation. The section shown in FIG. 1A is not identical to the section shown in FIG. 1B. The knowledge base is constituted in the form of a self-organizing, semantic, self-similar cognition network of objects or triple-SN. Such a triple-SN consists of semantic units 1 that are connected with each other via linking units 3 as shown by the connections between the semantic units 1 in FIGS. 1A and 1B. By multiple and repeated merging of semantic units 1 of a lower hierarchical level into a super-ordinated semantic unit 1 of a higher hierarchical level a hierarchical network of world knowledge is generated. In the case of triple-SN, the world knowledge is in more detail fractal-hierarchical, because similar processing operations are applied to all hierarchical levels. The triple-SN provides for a hierarchical structure of an arbitrary dimensionality, i.e., an n-dimensional object structure, wherein a hierarchical level of the hierarchical structure corresponds to a certain resolution of the world knowledge, which becomes more detailed in the hierarchical structure from the top to the bottom.

An essential component of the triple-SN is a particular form of the semantic unit 1, i.e., a so-called Janus-unit or processing unit 2. By a semantic Janus-unit 2, which is appended to one or more semantic units 2, local operations can be performed in the triple-SN. These local operations comprise, inter alia, generating of new semantic units 1, merging of already existing semantic units 1 to a single semantic unit 1 that is newly generated where required, modifying or deleting of already existing semantic units 1, and comparing of already existing semantic units 1. In this manner of using Janus-units 2 existing in the triple-SN, it is possible to modify the world knowledge in all possible manners.

The linking units 3 mentioned above can also be a particular form of the semantic units 1. In this manner, it is possible to perform the aforementioned arbitrary operations between arbitrary types of semantic units 1, which also comprise operations on Janus-units 2 and/or linking units 3 and therefore provide a triple-SN that can be arbitrarily modified. Therefore, the knowledge base existing in the triple-SN and consequently all in all the knowledge base can be arbitrarily modified.

In general, it can be considered that the triple-SN comprises a network of structure objects and a network of class objects. Structure objects are derived from data, information and/or knowledge. Class objects represent classes into which structure objects can be classified. Structure objects classified into class objects therefore represent respective instances of the respective class objects. The linking units 3 represent relations between respective of the above structure objects and/or class objects. Linking units 3 between structure objects on the same hierarchical level of the triple-SN represent neighborhood relations between the structure objects. Linking objects 3 between structure objects on different hierarchical levels of the triple-SN represent sub-ordinated and super-ordinated relations between the structure objects. Linking objects 3 between class objects on the same hierarchical level of the triple-SN represent neighborhood relations between the class object. Linking objects 3 between class objects on different hierarchical levels of the triple-SN represent sub-ordinated and super-ordinated relations between the class objects. Finally, linking objects 3 between structure objects and class objects represent classifying relations between the structure objects and class objects.

Although one embodiment of the present invention preferably uses the triple-SN as a knowledge base, another hierarchical structure can be used in which relations are present between respective objects.

Before describing the structural configuration of the embodiment, the manner in which the relation between data, information and knowledge is defined is described. In addition, the manner in which information can be derived from data, and in which knowledge can be derived from information is described.

Figure 2:
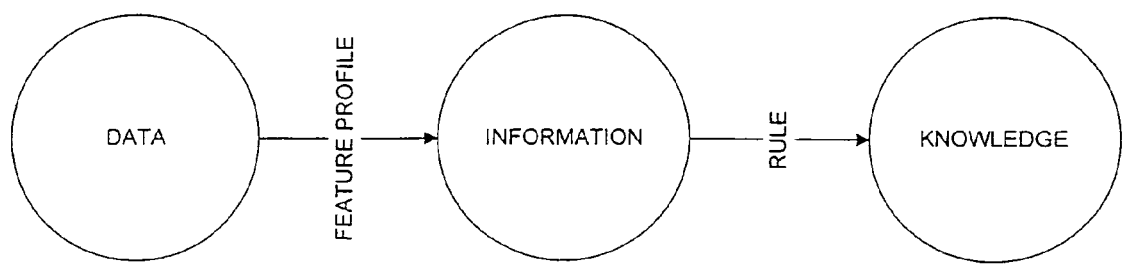
FIG. 2 is an illustration of a relation between data, information and knowledge according to the embodiment of the present invention.

FIG. 2 is an illustration of a relation between data, information and knowledge according to one embodiment. It should be noted that objects containing at least one of knowledge, information or data are hereinafter called "cognition structure objects". Feature profiles comprising features and membership functions are used to derive information from data as shown in FIG. 2. Furthermore, rules are used to derive knowledge from the information derived from the data. This is apparent from the following description of the structure of a knowledge base used in the embodiment.

The knowledge base of the embodiment of the present invention is constructed as a triple-SN. Each semantic unit within the triple-SN is described by the relations to its subordinate objects, to its neighborhood and to its super-ordinate objects, by its features and by its feature profiles. On the lowest hierarchical level of the triple-SN, data are stored that further comprise the spatial position as a feature. The lowest hierarchical level does not comprise sub-ordinate objects in the embodiment of the present invention. However, there could be a hierarchical level k=−1 with a separation if an end-member analysis is performed. The highest hierarchical level does not comprise super-ordinate objects.

In the hierarchical structure of the triple-SN, each hierarchical level of the triple-SN is defined by a number k of the hierarchical level and by a feature vector F(k) that comprises quantities characterizing a totality of all objects on the hierarchical level k, such as medium object size, number of objects, minimum and maximum object size, strength of segmentation of objects, and so on.

An example of such feature vector F(k) is shown in equation (1) of FIG. 16. Furthermore, for each hierarchical level k of the triple-SN there is defined a feature matrix F'(k) is defined. The feature matrix F'(k) is a matrix of degrees $\mu_{F(k)}$ (B) of membership to N base classes B. The degrees $\mu_{F(k)}$ (B) of membership are derived from membership functions for this hierarchical level k. One possible example of such a feature matrix F'(k) is shown in equation (2) of FIG. 16.

The membership functions $\mu_{F(k)}$ (B) to the N base classes define the feature profile of a feature of the hierarchical level k. There is also the possibility to store only the membership functions instead of the degrees $\mu_{F(k)}$ (B) in the feature matrix F'(k). The degrees $\mu_{F(k)}$ (B) of membership are then calculated if necessary. This leads to a higher flexibility because new membership functions can be transmitted and stored to further adapt an evaluation to a specific application.

Figure 3:
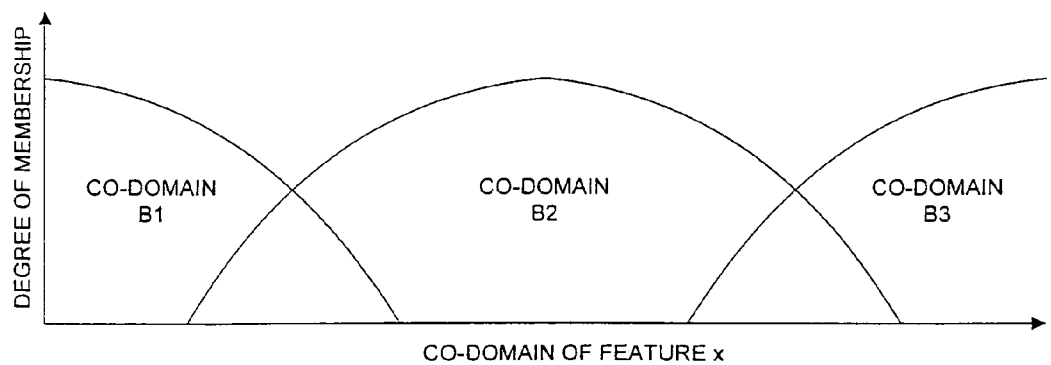
FIG. 3 is a diagram of membership functions used in the embodiment of the present invention.

FIG. 3 is a diagram of membership functions used in the embodiment. FIG. 3 shows a feature profile of a feature x. The abscissa shows the co-domain of feature x, and the ordinate shows the degree of membership of feature x to co-domains B1 to B3, which constitute classes in the embodiment. Therefore, feature profiles comprising relevant features and relevant membership functions are defined for data. These feature profiles again define a multi-dimensional space in which the original data are transformed to minimize an amount of transmission. This transformation generates information from the data.

Furthermore, rules are defined by means of which information derived from data with the aid of the feature profiles can be assigned to classes. These rules represent a further transformation prescription that transforms information to knowledge that describes the degree to which data can be assigned to a class that is being searched. As a result, a triple-SN is provided in which data, information and knowledge are stored in semantic units, which are also called "cognition structure objects" in this embodiment.

Figure 4:
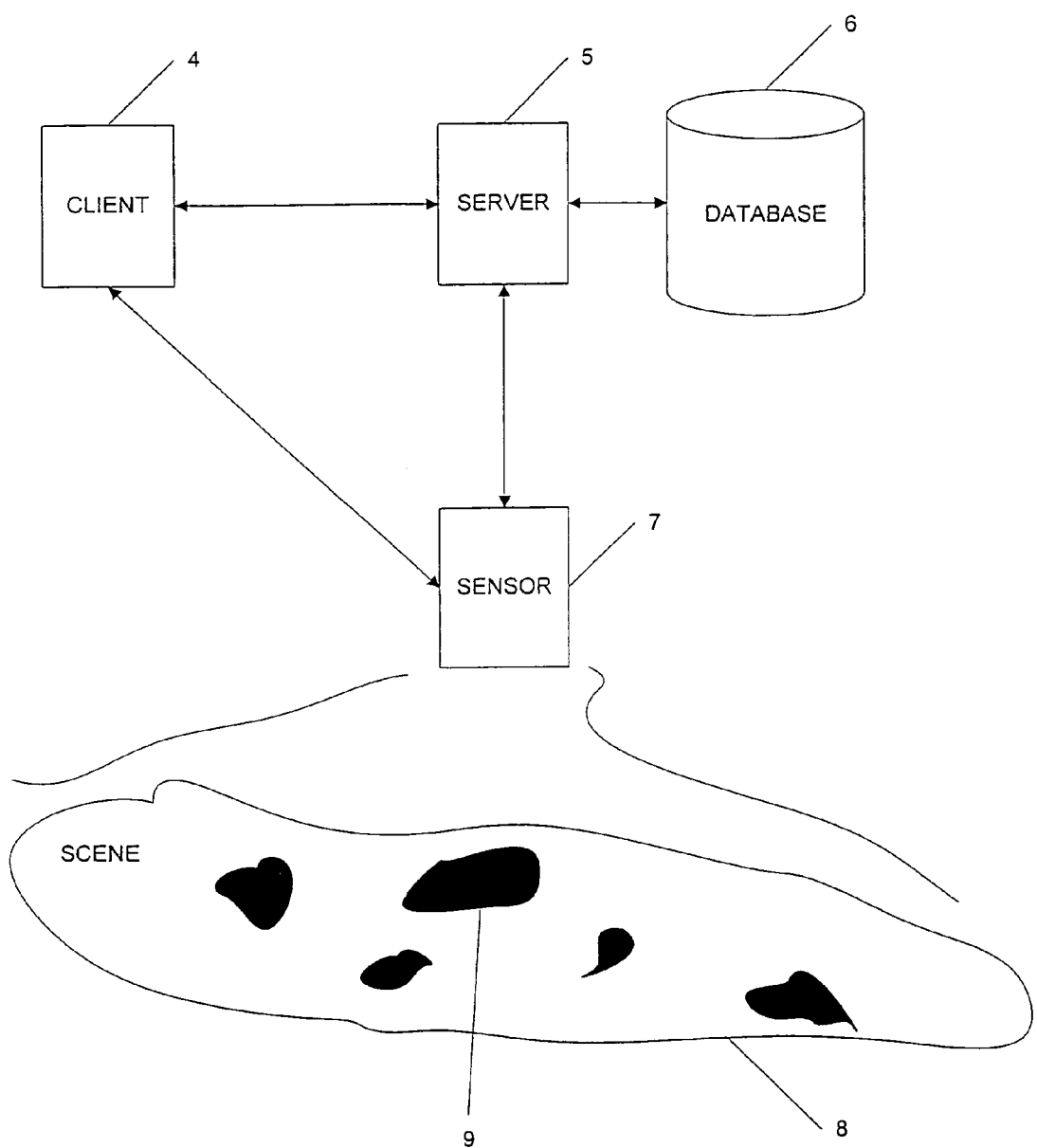
FIG. 4 is an illustration of a structure of a system according to the embodiment of the present invention.

FIG. 4 illustrates the structure of a system according to the embodiment. The system comprises a client 4, a sensor 5, a database 6 and a sensor 7 and is used to view a scene 8 comprising different objects 9. The system is not just applicable to visual scenes. Rather, the system can be applied to any kind of cognition structure objects, such as text data, spatial data and time data. The system can be locally adapted and applied to any kind of cognition structure objects simultaneously, successively, and dynamically. The system can also be used to generate any kind of cognition structure objects simultaneously, successively, dynamically, locally adapted and so on. Cognition structure objects can be transformed from one kind to another kind. This means that different kinds of cognition structure objects can be arbitrarily processed. Thus, the present invention provides a multimodal system and method. Furthermore, the database 6 is constituted by the knowledge base described above. Furthermore, the client 4, the server 5 and the sensor 7 can generally be called "system nodes" because the manner in which transmission of object features of cognition structure objects is identical for all system nodes.

In addition to the database 6 beside the server 5, cognition structure objects can also be locally stored near the client 4 or near the sensor. For example, the sensor could detect and create cognition structure objects based on the objects 9 within the scene 8 before a question as to specific cognition structure objects is made, for example from the client 4 to the sensor 7. In this case, the sensor 7 could firstly use the cognition structure objects stored therein and thereafter use cognition structure objects newly detected and created based on the objects 9 within the scene 8 with respect to the question from the client 4. Additional modifications of the system are also possible. The arrows in FIG. 4 show that there are different possibilities to communicate between the client 4, the server 5, the sensor 7 and the database 6. These will be described below in further detail.

Figure 5:
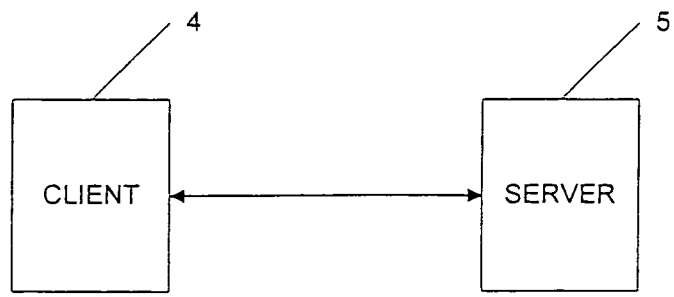
FIGS. 5 through 11 are schematic illustrations of different processing operations according to the embodiment of the present invention.
Figure 5:
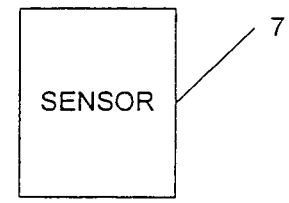
Figure 12:
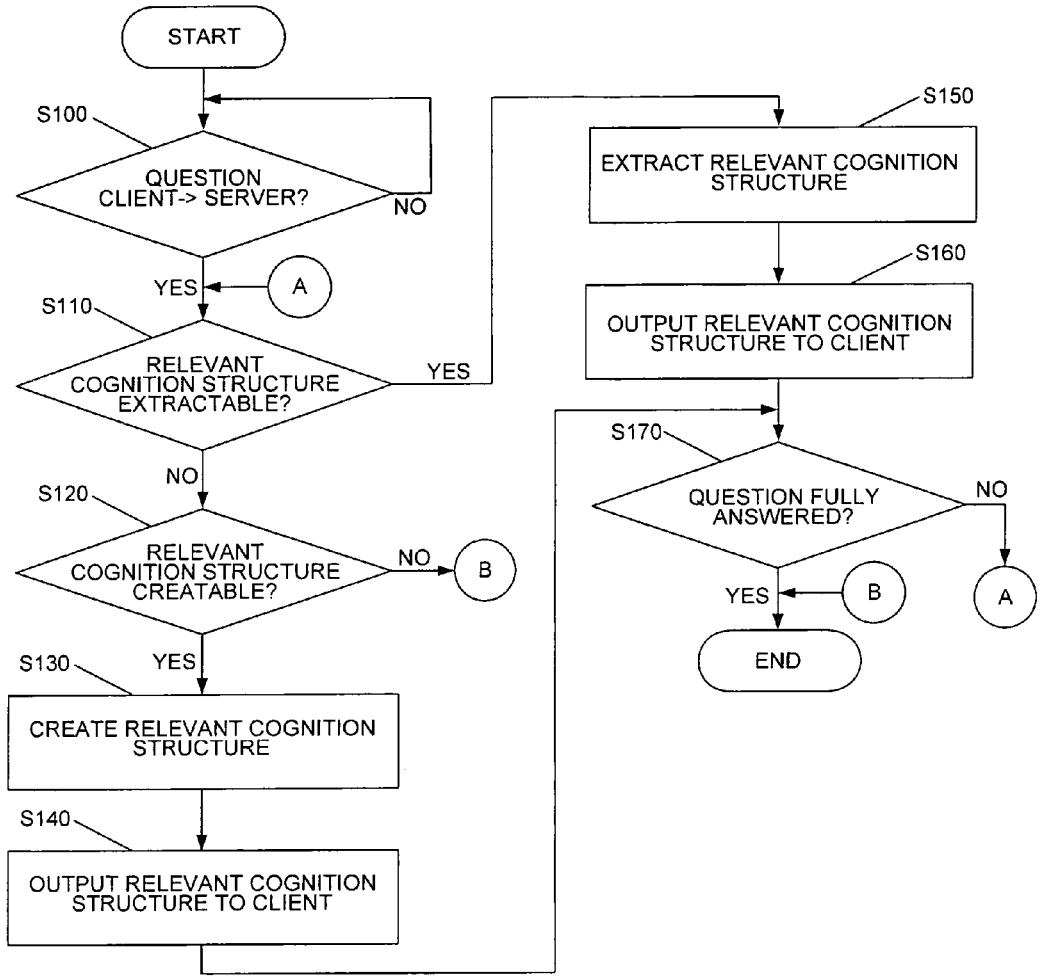
FIGS. 12 through 14 are flow charts concerning the different processing operations shown in FIGS. 5 through 11.

FIG. 5 is a schematic illustration of a first processing operation. The database 6 is not shown in FIG. 5, but it is assumed that the database 6 is also connected to the server is as shown in FIG. 4. FIG. 5 shows an interaction between the client 4 and the server 5. This interaction is described in more detail with reference to FIG. 12. As is shown in FIG. 12, in a step S100 the system checks whether or not a question regarding data, information and/or knowledge stored in the database 6 is transmitted from the client 4 to the server 5. If no question is transmitted, the procedure returns to the step S100. If a question is transmitted in the step S100, the procedure proceeds to a step S110, in which the system checks whether or not a relevant cognition structure comprising data, knowledge and/or information is extractable from the database 6. This is done at a high hierarchical level of the triple-SN constituting the knowledge base and consequently the database 6. The cognition structure objects are present in a very low resolution. It should be noted that the cognition structure objects are arranged within the triple-SN and transmitted progressively more faithful to detail from a higher hierarchical level of the triple-SN to a lower hierarchical level of the triple-SN.

If it is determined in a step Silo that no relevant cognition structure is extractable, the procedure proceeds to the step S120, in which it is determined whether or not a relevant cognition structure is creatable. If it is determined in the step S120 that no relevant cognition structure is creatable, the procedure ends. Otherwise, if it is determined in the step S120 that a relevant cognition structure is creatable, the procedure proceeds to a step S130, in which the relevant cognition structure is created. Thereafter, the procedure proceeds to a step S140, in which the relevant cognition structure is outputted from the database 6 to the client 4 via the server 5. After the step S140, the procedure proceeds to a step S170, in which it is determined whether or not the question has been fully answered. If it is determined in the step S170 that the question has been fully answered, the procedure ends. Otherwise, if it is determined in the step S170 that the question has not been fully answered, the procedure returns to the step S110 and is then again performed at a lower hierarchical level of the triple-SN to obtain a more detailed cognition structure of the triple-SN to fully answer the question.

If it is determined in the first determination of the step S110 that a relevant cognition structure is extractable, the procedure proceeds to the step S150 in which the relevant cognition structure is extracted from the database 6. Thereafter, the procedure proceeds to a step S160, in which the relevant cognition structure is outputted from the database 6 to the client 4 via the server 5. In the following step S170, the system checks whether or not the question has been fully answered. If it is determined in the step S170 that the question has been fully answered, the procedure ends. Otherwise, if it is determined in the step S170 that the question has not been fully answered, the procedure returns to the step S110 and is then again performed at a lower hierarchical level of the triple-SN to obtain a more detailed cognition structure of the triple-SN to fully answer the question.

FIG. 12 shows that the procedure is iteratively performed from higher herarchical levels to lower levels of the triple-SN until (i) the question has been fully answered, (ii) no relevant cognition structure is extractable or treatable, or (iii) the procedure is interrupted or terminated for example by a user.

By means of the aforementioned procedure, it is possible to transmit object features of cognition structure objects existing in the database 6 from the database 6 to the client 4 via the server 5. Furthermore, new cognition structure objects can be created and outputted to the client 4. In addition, new cognition structure objects can be stored near the database 6 and used in further processing operations. Furthermore, all processing operations described above with respect to the triple-SN can be performed at the time of performing the aforementioned procedure to modify cognition structure objects stored in the database. In addition, the object features of the extracted and/or created cognition structure objects can be additionally stored near the client 4 to be available as local knowledge, information and/or data at a later processing operation. The same holds true in a similar manner for all other procedures for transmission object features between system nodes, such as client 4, server 5 and sensor 7.

Figure 6:
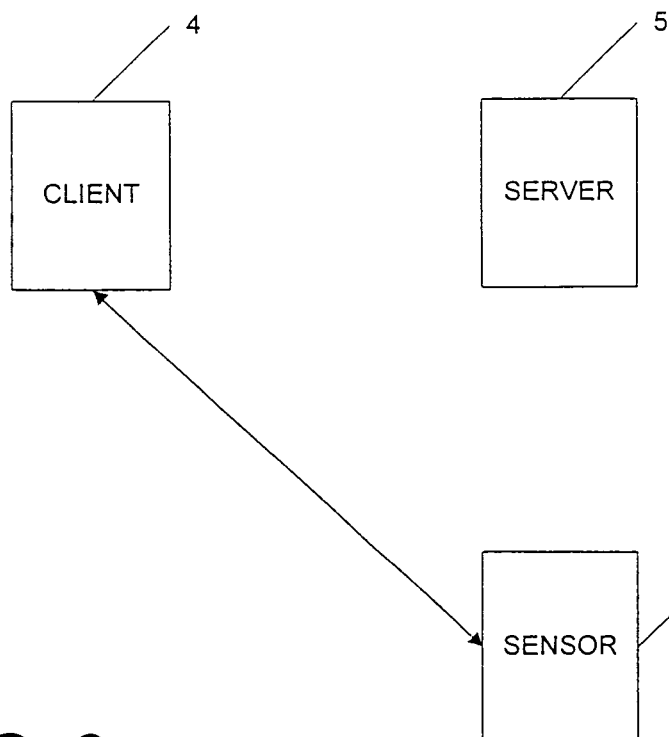
Figure 13:
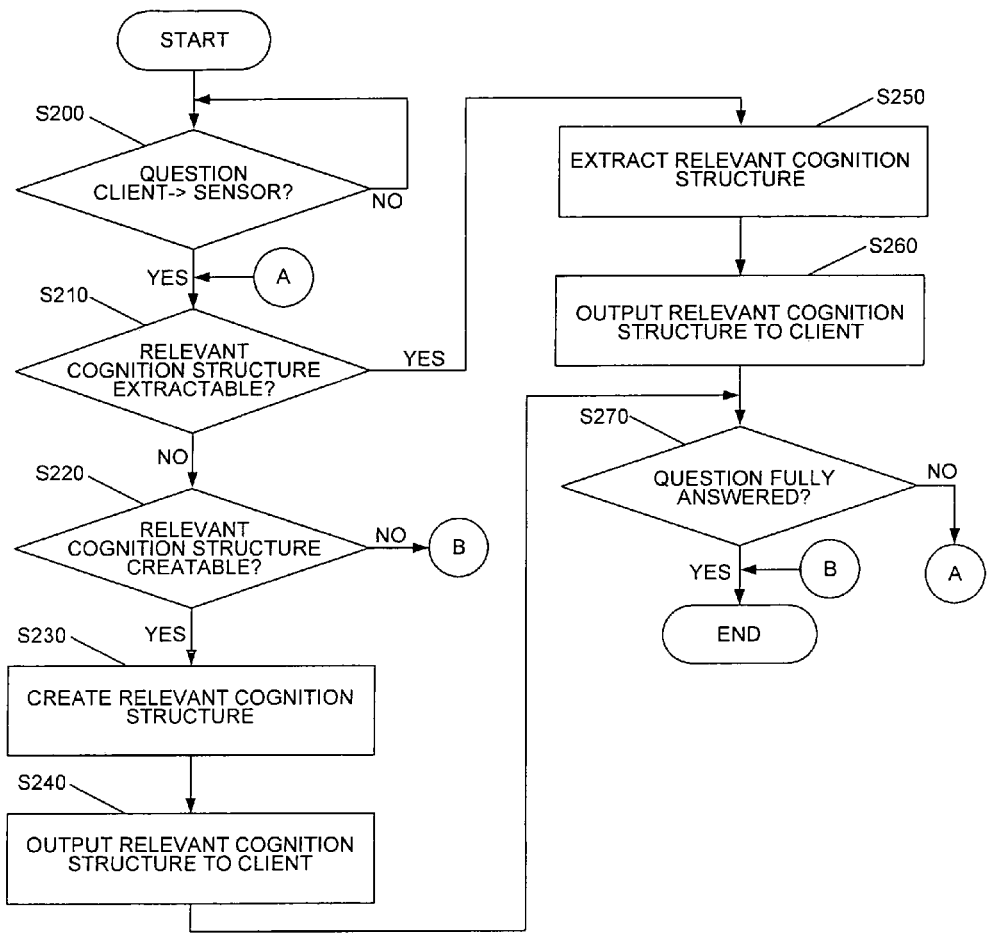

FIG. 6 is a schematic illustration of a second processing operation according to another embodiment. FIG. 6 shows an interaction between the client 4 and the sensor 7. As is shown in FIG. 13, in a step S200 the system checks whether or not a question has been transmitted from the client 4 to the sensor 7. The question can relate to data, information and/or knowledge about the objects 9 within the scene 8 that has been detected by the sensor 7. In addition, the question may relate to locally stored data, information and or knowledge near the sensor 7. If no question is transmitted, the procedure returns to the step S200. If a question is transmitted in the step S200, the procedure proceeds to a step S210, in which the system checks whether or not a relevant cognition structure comprising data, knowledge and/or information is extractable from the sensor 7 and/or the scene 8. This is done at a high hierarchical level.

If it is determined in the step S210 that no relevant cognition structure is extractable, the procedure proceeds to the step S220, in which it is determined whether or not a relevant cognition structure is creatable. If it is determined in the step S220 that no relevant cognition structure is creatable, the procedure ends. Otherwise, if it is determined in the step S220 that a relevant cognition structure is creatable, the procedure proceeds to a step S230, in which the relevant cognition structure is created.

Thereafter, the procedure proceeds to a step S240, in which the relevant cognition structure is outputted from the sensor 7 to the client 4. Thereafter, the procedure proceeds to a step S270, in which it is determined whether or not the question has been fully answered. If it is determined in the step S270 that the question has been fully answered, the procedure ends. Otherwise, if it is determined in the step S270 that the question has not been fully answered, the procedure returns to the step S210 and the same is again performed at a lower hierarchical level to obtain a more detailed cognition structure to fully answer the question.

If it is determined in the first determination of the step S210 that a relevant cognition structure is extractable, the procedure proceeds to the step S250 in which a relevant cognition structure is extracted. Thereafter, the procedure proceeds to a step S260, in which the relevant cognition structure is outputted from the sensor 7 to the client 4. Thereafter, the procedure proceeds to the step S270, in which the system checks whether or not the question has been fully answered. If the question has been fully answered, the procedure ends. If the question has not been fully answered, the procedure returns to the step S210 and is then again performed at a lower hierarchical level of the triple-SN to obtain a more detailed cognition structure of the triple-SN to fully answer the question.

FIG. 13 shows that the procedure is iteratively performed from higher hierarchical levels to lower levels until (i) the question has been fully answered, (ii) no relevant cognition structure is extractable or creatable, or (iii) the procedure is interrupted or terminated for example by a user.

Figure 7:
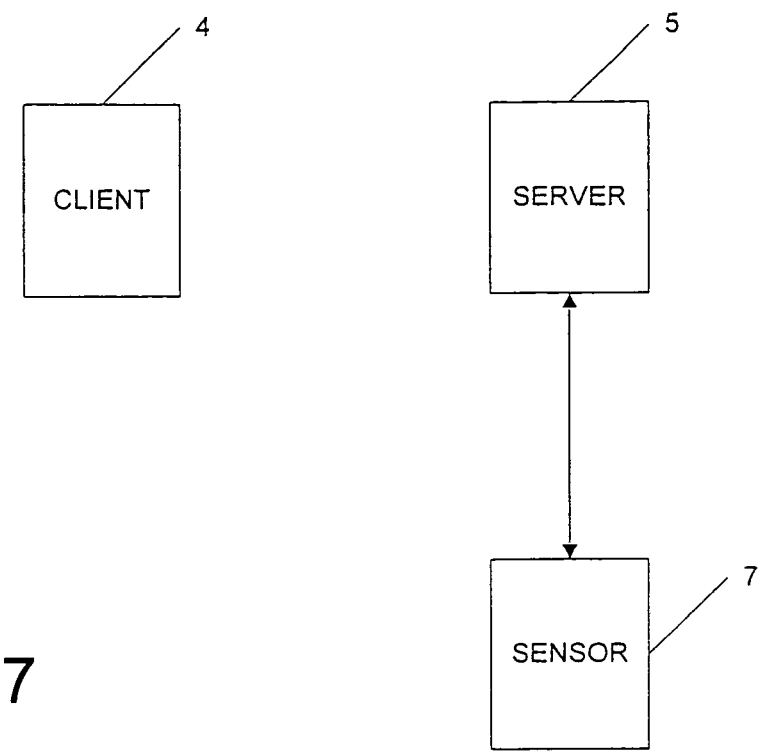
Figure 14:
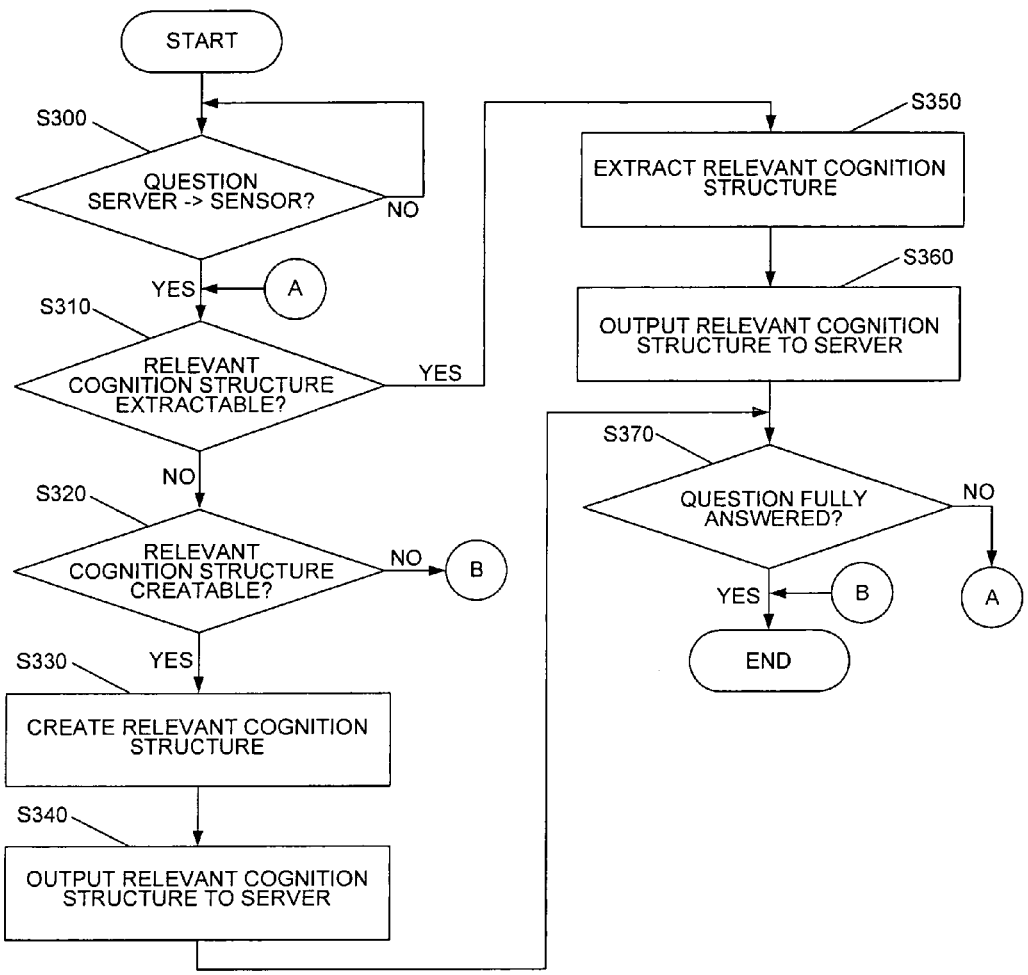

FIG. 7 is a schematic illustration of a third processing operation according to another embodiment. FIG. 7 shows an interaction between the sensor 7 and the server 5. This interaction is described in more detail with reference to FIG. 14. As shown in FIG. 14, in a step S300, the system checks whether or not a question regarding data, information and/or knowledge in the scene 8 near the sensor 7 and/or locally stored data, information and/or knowledge near the sensor 7 is transmitted from the server 5 to the sensor 7. If no question is transmitted, the procedure returns to the step S300. If a question is transmitted in the step S300, the procedure proceeds to a step S310, in which it is checked whether or not a relevant cognition structure comprising data, knowledge and information is extractable from the sensor 7 or the scene 8. This is done at a high hierarchical level.

If it is determined in the step S310 that no relevant cognition structure is extractable, the procedure proceeds to the step S120, in which it is determined whether or not a relevant cognition structure is creatable. If it is determined in the step S120 that no relevant cognition structure is creatable, the procedure proceeds to the step S330, in which the relevant cognition structure is created. Thereafter, the procedure proceeds to the step S340, in which the relevant cognition structure is outputted from the sensor 7 to the server 5.

Thereafter, the procedure proceeds to a step S370, in which it is checked whether or not the question has been fully answered. If it is determined in the step S370 that the question has been fully answered, the procedure ends. Otherwise, if it is determined in the step S370 that the question has not been fully answered, the procedure returns to the step S310 and is then again performed at a lower hierarchical level to obtain a more detailed cognition structure to fully answer the question. If it is determined in the first determination of the step S110 that a relevant cognition structure is extractable, the procedure proceeds to a step S150, in which the relevant cognition structure is extracted from the data base 6. Thereafter, the procedure proceeds to a step S360, in which the relevant cognition structure is outputted from the sensor 7 to the server 5. In the following step S370, the system checks whether or not the question has been fully answered. If the question has been fully answered, the procedure ends. If the question has not been fully answered, the procedure returns to the step S110 and is then again performed at a lower hierarchical level of the triple-SN to obtain a more detailed cognition structure of the triple-SN to fully answer the question.

FIG. 14 illustrates that the procedure is iteratively performed from higher hierarchical levels to lower hierarchical levels of the triple-SN. The procedure is repeated until the question has been fully answered or no relevant cognition strucure is extractable or creatable.

Figure 8:
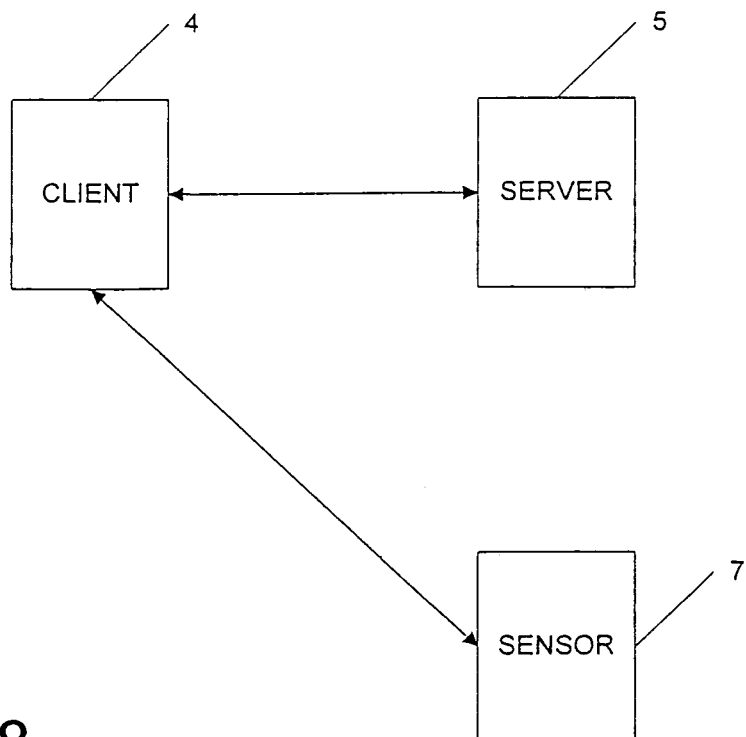

FIG. 8 is a schematic illustration of a fourth processing operation according to yet another embodiment. FIG. 8 shows an interaction between the client 4 and the server 5 and between the client 4 and the sensor 7. Since these interactions are a combination of the interactions shown in FIGS. 12 and 13, a detailed description of these interactions is omitted here. However, it should be noted that these procedures can be performed simultaneously, successively or in a overlapping manner as the need arises.

Figure 9:
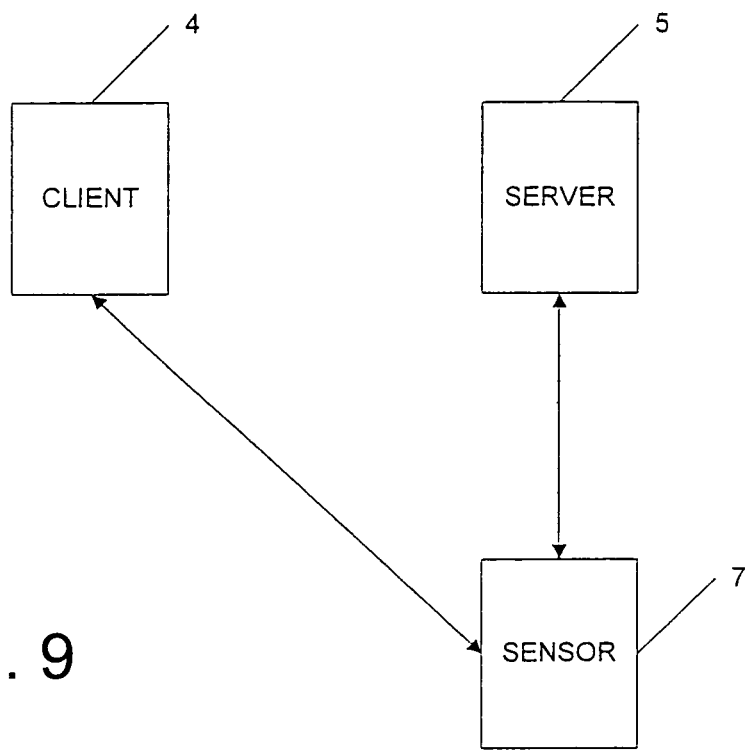

FIG. 9 is a schematic illustration of a fifth processing operation according to yet another embodiment. FIG. 9 shows interactions between the client 4 and the sensor 7 and between the server 5 and the sensor 7. Since these interactions are a combination of the interactions shown in FIGS. 13 and 14, a detailed description of these interactions is omitted here. However, it should be noted that these procedures can be performed simultaneously, successively or in a overlapping manner as the need arises.

Figure 10:
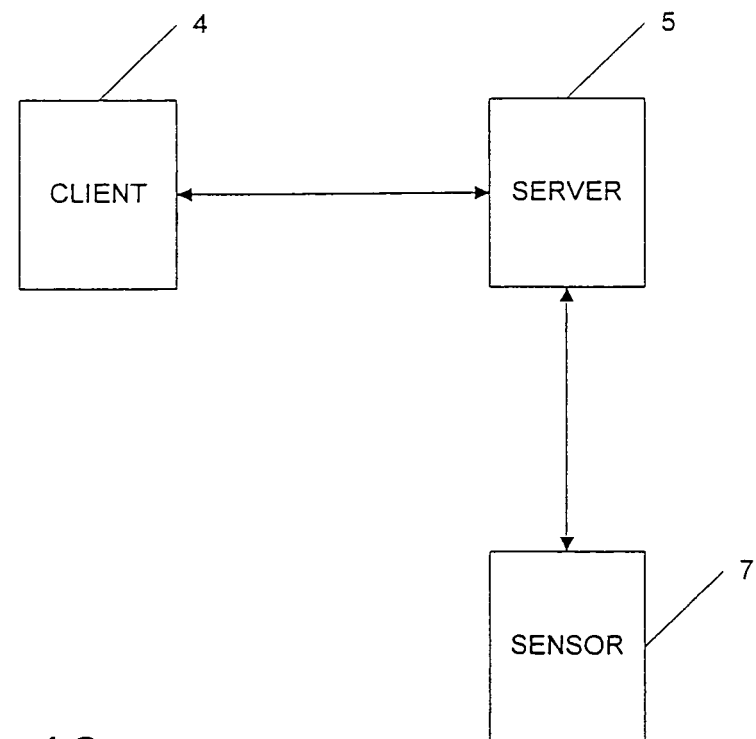

FIG. 10 is a schematic illustration of a sixth processing operation according to yet another embodiment. FIG. 10 shows interactions between the client 4 and the server 5 and between the server 5 and the sensor 7. Since these interactions are a combination of the interactions shown in FIGS. 12 and 14, the description of these interactions is omitted here. However, it should be noted that these procedures can be performed simultaneously, successively or in a overlapping manner as the need arises.

Figure 11:
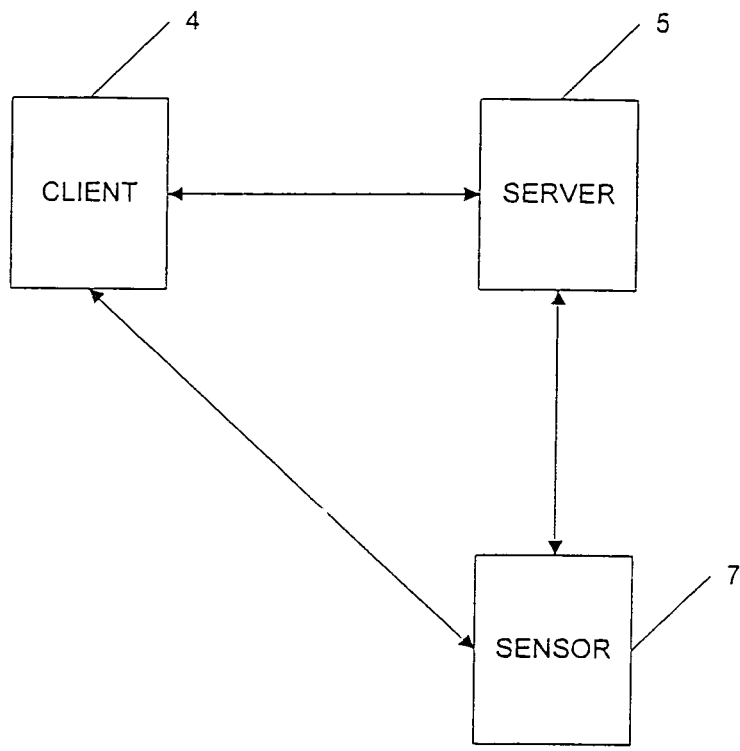

Finally, FIG. 11 is a schematic illustration of a seventh processing operation according to yet another embodiment. FIG. 11 shows interactions between the client 4 and the server 5, between the client 4 and the sensor 7 and between the server 5 and the sensor 7. Since these interactions are a combination of the interactions shown in FIG. 12 to 14, a detailed description of these interactions is omitted here. However, it should be noted that these procedures can be performed simultaneously, successively or in a overlapping manner as the need arises.

Figure 15:
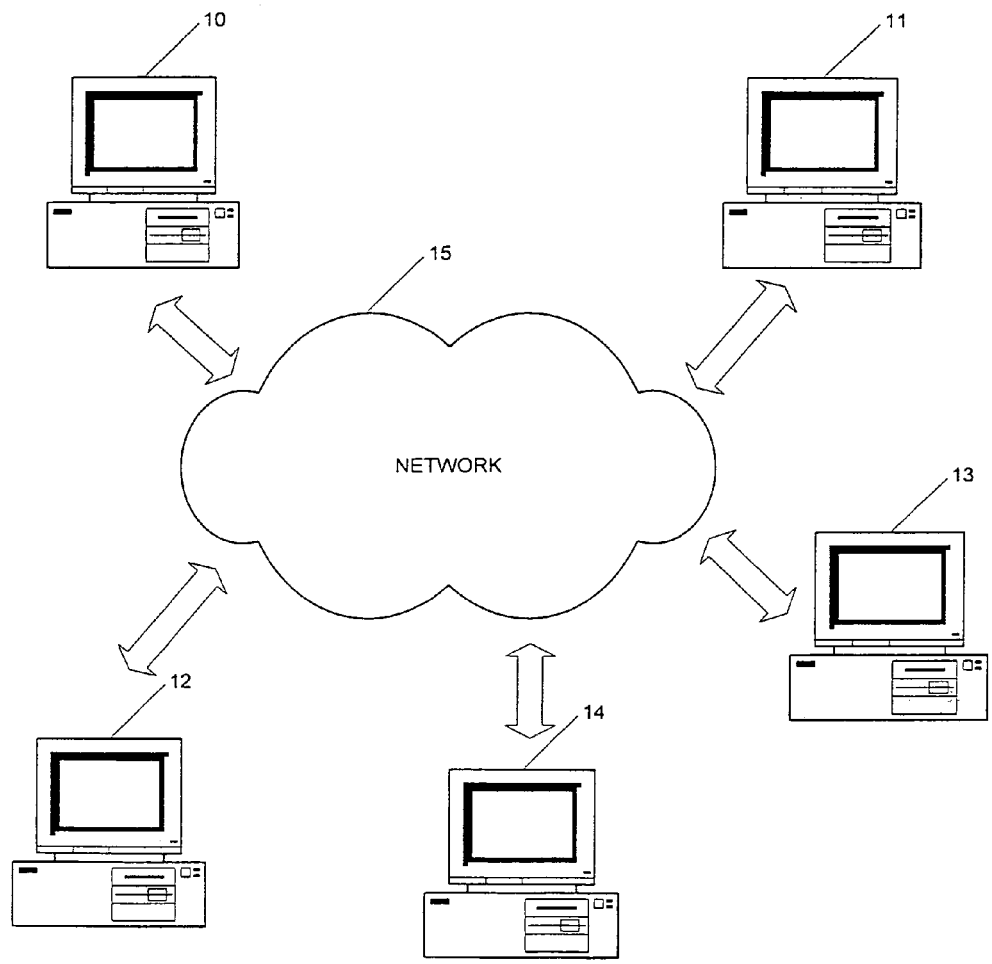
FIG. 15 is a overall structure of a generalized system according to the embodiment of the present invention.

FIG. 15 shows the overall structure of a general system according to one embodiment of the present invention. The system can be generalized such that several system nodes comprising clients 4, servers 5 and/or sensors 7 can be provided as system nodes 10 to 14, which are connected via a network 15. The system can be a distributed network comprising a plurality of system nodes 10 to 14 if the need arises.

It should be noted that there is generally described a transmission between system nodes because, in a general system, each of the system nodes can function as at least one of a client 4, a server 5 and a sensor 7. It is assumed that these system nodes are coupled via intelligent interfaces with each other for performing a communication. The intelligent interfaces transfer object features of cognition structure objects comprising knowledge, information and data depending on a respective question transmitted progressively more faithful to detail.

Although the present invention has been described in connection with certain specific embodiments for instructional purposes, the present invention is not limited thereto. Specific cognition structure objects can be stored locally near one or more system nodes and can be used in further processing operations. The system is applicable to all kind of cognition structures such as data, information and/or knowledge comprising cognition structures based on physical quantities and cognition structures not based on physical quantities. The capacity transmission channel can be extremely decreased by transmitting knowledge, information and/or data present in a hierarchical structure in the aforementioned manner. Accordingly, various modifications, adaptations, and combinations of various features of the described embodiments can be practiced without departing from the scope of the invention as set forth in the claims.

What is claimed is:

1. A computer-implemented system for progressively transmitting knowledge between system nodes of a network structure, comprising:
   a plurality of system nodes; and
   intelligent interfaces that couple system nodes to each other and that establish communication between said plurality of system nodes, wherein the intelligent interfaces transmit object features of cognition structure objects, wherein the object features comprise knowledge, information and data depending on a question of one of said plurality of system nodes, and the object features are transmitted progressively more faithful to detail from another of the respective system nodes to the one of the respective system nodes, and wherein those object features comprising knowledge are transmitted with higher priority than are those object features comprising data.

2. The system of claim 1, wherein relations are present between cognition structure objects.

3. The system of claim 1, wherein the cognition structure objects are hierarchically structured, and wherein data objects are located on a lower level of the hierarchical structure.

4. The system of claim 3, wherein the transmitting progressively more faithful to detail is performed by transmitting object features first from a higher level and then from the lower level of the hierarchical structure.

5. The system of claim 1, wherein each system node comprises one of a client, a server and a sensor.

6. The system of claim 5, wherein the server comprises a database.

7. The system of claim 1, wherein different kinds of cognition structure objects are arbitrarily processed leading to a multi-modal processing.

8. A computer-implemented method for progressively transmitting knowledge between system nodes of a network structure, the method comprising:
   transmitting object features of cognition structure objects progressively more faithful to detail, wherein the object features comprise knowledge, information and data depending on a question of one of the system nodes from another of the respective system nodes to the one of the respective system nodes, and wherein those object features comprising knowledge are transmitted with higher priority than are those object features comprising data.

9. The method of claim 8, wherein relations are present between cognition structure objects.

10. The method of claim 8, wherein the cognition structure objects are hierarchically structured, and wherein data objects are located on a lower level of the hierarchical structure.

11. The method of claim 8, wherein the transmitting progressively more faithful to detail transmitting is performed by transmitting object features first from a higher level and then from a lower level of a hierarchical structure.

12. The method of claim 8, wherein each system node comprises a client, a server and a sensor.

13. The method of claim 12, wherein the server comprises a database.

14. The method of claim 8, wherein different kinds of cognition structure objects are arbitrarily processed leading to a multi-modal processing.

15. A computer-readable medium that is not a transitory signal comprising program instructions for performing the steps of:
  transmitting object features of cognition structure objects progressively more faithful to detail between system nodes of a network structure, wherein the object features comprise knowledge, information and data depending on a question of one of the system nodes from another of the respective system nodes to the one of the respective system nodes, and wherein those object features comprising knowledge are transmitted with higher priority than are those object feature comprising data.

16. The computer-readable medium of claim 15, wherein the cognition structure objects are hierarchically structured, and wherein data objects are located on a lower level of the hierarchical structure.

17. The computer-readable medium of claim 15, wherein the transmitting progressively more faithful to detail is preformed by transmitting object features first from a higher level and then from a lower level of a hierarchical structure.

18. A system comprising:
  a plurality of system nodes coupled to each other; and
  means for progressively transmitting knowledge and data between the system nodes, wherein a question of one of the system nodes regarding the knowledge and the data is transmitted from another of the system nodes to the one system node, wherein the knowledge and data are transmitted progressively more faithful to detail from the one system node to the other system node, and wherein the knowledge is transmitted with higher priority than is the data.

19. The system of claim 18, wherein the means for progressively transmitting knowledge performs the progressively more faithful to detail transmitting by transmitting the knowledge and data first from a higher level and then from a lower level of a hierarchical structure.

20. The system of claim 18, wherein the means for progressively transmitting knowledge transmits object features of cognition structure object progressively more faithful to detail between the system nodes.

21. A computer-implemented system for progressively transmitting knowledge between system nodes of a network structure, comprising:
  a first system node including a first structure object;
  a second system node including a second structure object; and
  intelligent interfaces that couple the first system node to the second system node and that establish communication between the first system node and the second system node, wherein the intelligent interfaces transmit progressively more faithful to detail object features of the first structure object to the second system node depending on a question of the second system node transmitted from the second system node to the first system node, wherein the object features comprise knowledge, information and data, wherein the transmitting of the object features is performed progressively more faithful to detail from a higher hierarchical level of the network structure to a lower hierarchical level of the network structure, and wherein those object features comprising knowledge are transmitted with higher priority than are those object features comprising data.

22. The system of claim 21, wherein those object features comprising information are transmitted with higher priority than are those object features comprising data.

23. The system of claim 21, wherein those object features comprising knowledge are transmitted with higher priority than are those object features comprising information.

24. The system of claim 21, wherein the first system node is taken from the group consisting of: a server, a client and a sensor.

* * * * *

UNITED STATES PATENT AND TRADEMARK OFFICE
CERTIFICATE OF CORRECTION

| | |
|---|---|
| PATENT NO. | : 8,909,692 B2 |
| APPLICATION NO. | : 11/244751 |
| DATED | : December 9, 2014 |
| INVENTOR(S) | : Athelogou et al. |

It is certified that error appears in the above-identified patent and that said Letters Patent is hereby corrected as shown below:

In the Claims,

Column 11, line 6, the word "transmitting" should be deleted.

The text of column 11, lines 5-8 should now read:

11. The method of claim 8, wherein the transmitting progressively more faithful to detail is performed by transmitting object features first from a higher level and then from a lower level of a hierarchical structure.

Column 12, line 11, the word "object" should be changed to --objects--.

The text of column 12, lines 9-12 should now read:

20. The system of claim 18, wherein the means for progressively transmitting knowledge transmits object features of cognition structure objects progressively more faithful to detail between the system nodes.

Signed and Sealed this
Third Day of March, 2015

Michelle K. Lee
*Deputy Director of the United States Patent and Trademark Office*